Feb. 23, 1926.
E. A. FOSTER
1,574,729
TRACTION INCREASING DEVICE FOR MOTOR VEHICLES
Filed July 17, 1925
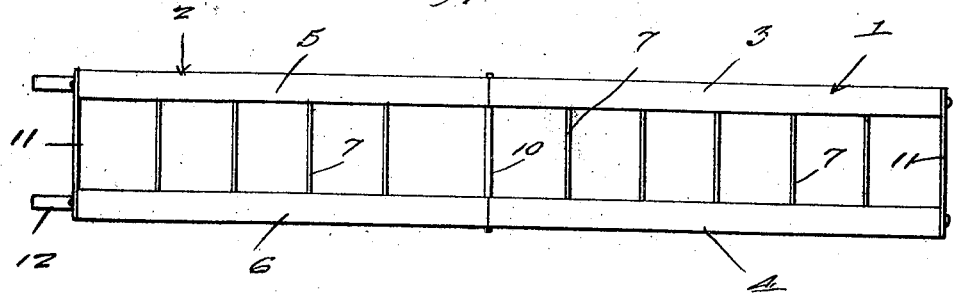
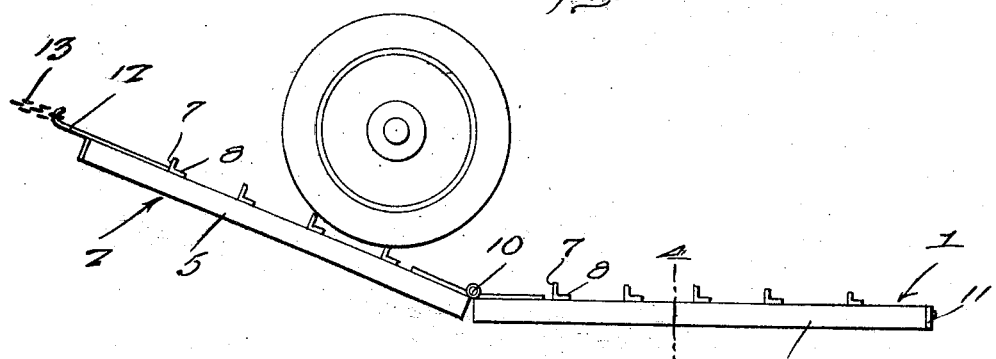
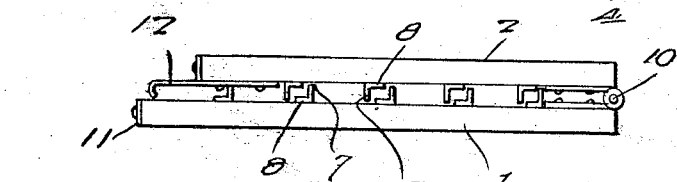
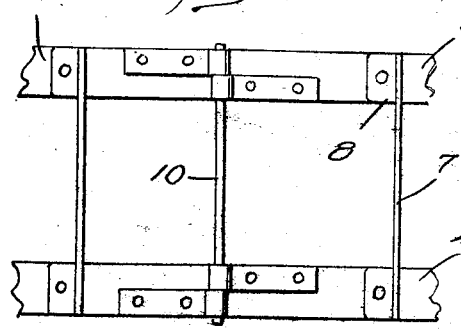
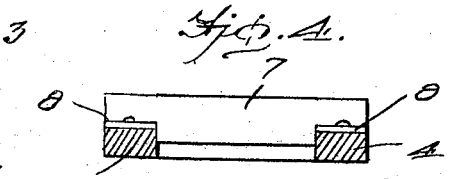
Inventor
E. A. Foster
By Clarence A. O'Brien
Attorney Patented Feb. 23, 1926.

1,574,729

UNITED STATES PATENT OFFICE.

EPHRIAM A. FOSTER, OF MASSILLON, OHIO.

TRACTION-INCREASING DEVICE FOR MOTOR VEHICLES.

Application filed July 17, 1925. Serial No. 44,344.

*To all whom it may concern:*

Be it known that I, EPHRIAM A. FOSTER, a citizen of the United States, residing at Massillon, in the county of Stark and State of Ohio, have invented certain new and useful Improvements in a Traction-Increasing Device for Motor Vehicles, of which the following is a specification.

This invention relates to a simple and efficient device for increasing the traction of the drive wheels of a motor vehicle when the same have become stuck in mud, sand, so as to facilitate the extrication of the motor vehicle.

Another important object of the invention is to provide a traction increasing device of the above mentioned character which may be readily and easily placed in position beneath the rear wheels of a motor vehicle, the device being of such construction as to adapt itself to the inclinations of the road beds in order to insure the extrication of the wheels of the vehicle from the mud or sand in which the same are entrenched.

A further object is to provide a traction increasing device of the above mentioned character which is simple in construction and inexpensive, and further adapted to the purposes for which the same is designed.

A still further object is to provide a traction increasing device which may be readily and easily folded in a compact manner so as to enable the device to be stored away in the automobile without occupying any considerable amount of space, and thus at all times at hand.

Other objects and advantages of this invention will become apparent during the course of the following description.

In the accompanying drawing forming part of this specification, and in which like numerals are employed to designate like parts throughout the same:

Figure 1 is a bottom plan view of my improved traction increasing device.

Fig. 2 is a side elevation thereof showing the manner in which the same is used.

Fig. 3 is an enlarged fragmentary plan showing the hinge connection between the sections.

Fig. 4 is a sectional view taken approximately on the line 4—4 of Fig. 2, and

Fig. 5 is a side elevation of the device showing the same in its folded inoperative position.

In the drawing wherein for the purpose of illustration is shown the preferred embodiment of my invention, the numerals 1 and 2 designate the complementary sections of my improved traction increasing device, the same including the longitudinal side beams or bars 3 and 4 respectively, the longitudinal side beams or bars of the section 2 being designated by the numerals 5 and 6. The longitudinal side beams or bars of the respective sections are held in spaced relation through the medium of the transversely extending vertically disposed metallic plates 7 which form cleats, the upper edges of which are engaged by the wheels of the vehicle in a manner as clearly illustrated in Fig. 2.

Each of the cleats has its respective ends provided with the laterally disposed portion 8 formed by slitting the lower portion of each plate adjacent the respective ends as at 9, a portion between the slits being disposed between the side beams or bars of each of the sections and the laterally disposed portions 8 being secured to the top of the respective side beams or bars as is clearly illustrated in Figs. 3 and 4 of the drawings.

These cleats are arranged in parallel spaced relation with respect to each other. The interposed ends of the respective side beams or bars of the sections 1 and 2 are hingedly secured together as at 10. The hinged construction is clearly illustrated in Fig. 3 of the drawing.

The cleats are arranged on the respective sections in such a manner as to permit the section 2 to be folded back upon the section 1 so that the cleats on the sections will not strike each other when the sections are in folded position as is clearly illustrated in Fig. 5. In this manner, the device will be compact and may be stored away in any suitable place without occupying any considerable amount of space.

A metallic strip 11 extends across the ends of the side beams or bars of each of the sections. Extending outwardly from the ends of the side beams or bars of the section 2 which is of less length than the section 1 are the hooks 12, the same being secured at their inner ends on the top pieces of the side beams or bars of the section 2. These hooks provide a means for attaching the traction device to the vehicle through the medium of the chains 13 when the device is in use.

In use, the device is placed under one of the rear wheels of the motor vehicle which has become entrenched in the mud or sand and the forward section is connected to the vehicle by the chains and hooks and it is obvious that when the motor is started, the rear wheel will travel over the upper edges of the cleats which project above the side bars or beams of the sections and thus enable the vehicle to extricate itself from the mud or sand.

The hinged connection between the sections enables the latter to adapt itself to the inclinations or irregularities in the road beds so as to facilitate the ready and easy disengagement of the rear wheels of the vehicle from the portion of the road in which the same have become stuck.

While I have shown the preferred embodiment of my invention, it is to be understood that various changes in the size, shape and arrangement of parts may be resorted to without departing from the spirit or sacrificing any of the advantages of the appended claim.

Having thus described my invention, what I claim as new is:—

A traction increasing device of the class described comprising a pair of hingedly connected sections, each section including a pair of spaced side members, and vehicle engaging cleats extending transversely across the side members, the upper portions of said cleats being disposed above said side members, each cleat comprising a metallic plate, the same being slit vertically from its bottom edge adjacent the respective ends thereof, the lower end portions of each cleat being bent laterally and secured to the top of the respective side members of each section.

In testimony whereof I affix my signature.

EPHRIAM A. FOSTER.